(12) United States Patent
Campbell

(10) Patent No.: US 6,478,478 B1
(45) Date of Patent: Nov. 12, 2002

(54) FIBER-OPTIC CONNECTOR

(76) Inventor: Patrick J. Campbell, P.O. Box 23952, Pleasant Hill, CA (US) 95423

( * ) Notice: Subject to any disclaimer, the term of this patent is extended or adjusted under 35 U.S.C. 154(b) by 78 days.

(21) Appl. No.: 09/730,410

(22) Filed: Dec. 4, 2000

(51) Int. Cl.[7] ................................................. G02B 6/36
(52) U.S. Cl. .......................... 385/89; 385/117; 362/554
(58) Field of Search .............................. 385/88, 89, 49, 385/115, 116–120; 362/554; 606/15, 16

(56) References Cited

U.S. PATENT DOCUMENTS 4,648,838 A * 3/1987 Schlachter .................. 433/29
5,882,102 A * 3/1999 Pileski
2002/0012502 A1 * 1/2002 Farrar et al. .................. 385/53

* cited by examiner

Primary Examiner—Hemang Sanghavi
(74) Attorney, Agent, or Firm—Theodore J. Bielen, Jr.

(57) ABSTRACT

A fiber-optic connector utilizing a first tube for receiving a source of light and a second tube separated from the first tube enclosing an optic bundle. A first guide surrounds the first tube and positions the first tube along an axis to place the same adjacent the second tube. A second guide determines radial orientation of the first tube relative to the second tube by engaging planar surfaces on the second guide.

12 Claims, 2 Drawing Sheets

FIBER-OPTIC CONNECTOR

BACKGROUND OF THE INVENTION

The present invention relates to a novel and useful fiber-optic connector.

Fiber-optic bundles are used to direct light in a very effective manner to a desired place. In most cases, light emanates from a light source and enters the end of the fiber-optic bundle. The interface between the fiber-optic bundle and a light source must be accomplished efficiently, since light losses occur at this point if this is not the case. In the past, fiber-optic bundles have been located in conduits and connected to other conduits directing a light source to the area of the fiber-optic bundle. In many cases, the conduits have been abutted and sealed to one another to prevent light losses at this point.

Fiber scopes have been used in industrial and surveillance applications in which a fiber-optic bundle is extended between a remote viewing site and a scope to permit persons to observe a remote site without assembly of structures. In certain instances, additional sources of light have been conveyed to the fiber-optic bundle to increase the efficiency of the fiber-optic bundle being used to observe a remote site. Where the fiberscope is employed in surveillance or emergency situations, it is undesirable to employ an auxiliary light source, since light emanating from the source is observable at the imaging end of the fiber-optic bundle. Thus, removal of the auxiliary light source is necessary these situations. Unfortunately, fiberscopes, in the past, have not included easily disassembled light sources, resulting in intensive labor efforts to eliminate the same, at best.

A fiber-optic connector which is reliable and easily manipulated would be a notable advance in the field of fiber-optics.

BRIEF SUMMARY OF THE INVENTION

In accordance with the present invention a novel and useful fiber-optics connector device is herein provided.

The fiber-optic connector of the present invention is intended to couple a source of light to a fiber-optic bundle. In this regard, the connector includes a first tube for receiving the source of light and directing the same through the bore of the tube to an exit. The first tube lies along a first axis. It should be noted that the beam of light passing through the tube is not necessarily coincident with the axis of the tube since filament shadows require off-axis travel of a light beam to the fiber-optic bundle end, which will be discussed hereinafter.

A second tube is also utilized in the present invention and contains the fiber-optic bundle. The second tube is separable from the first tube and lies along a second axis. In general the second tube is associated with a fiberscope or similar article to provide an auxiliary light source from the first tube to the fiberscope.

A first guide surrounds the first tube to direct or position the first tube along the first axis, to a place adjacent the second tube. In certain cases, the ends of the first and second tubes may engage one another, although this is not necessary. The first guide may take the form of a conduit or bushing which surrounds the first and second tubes and, specifically, permits the first tube to slide therewithin into a place to adjoin the second tube. The end of the first guide may also serve as a gage to regulate the distance the first tube travels within the bore of the bushing in order to lie at a place adjacent the second tube. Such engaging function would take place when the conduit of the first guide bottoms or contacts a portion of the second guide which will be discussed hereinafter.

A second guide is also utilized in the present invention for directing or positioning the first tube radially about the first axis. The second guide possesses a first member linked to the first tube. The first member includes a planar surface. A second member is linked to the second tube and also includes a planar surface. The first and second planar surfaces engage each other, for example, with a sliding contact.

At certain times, means for circumferentially adjusting the position of the planar surface of the first member relative to the first axis may also be employed. Such adjustment means may take the form of a body through which a set screw passes. The set screw would engage a grove in the first member to determine its rotation about the first tube. In this way, the direction of the light source light beam can be accurately determined to maximize the efficiency of light passing to the fiber-optic bundle found in the second tube.

To assure the connection or coupling of the first tube to a place adjacent the second tube, utilizing the first and second guides, a collar may be provided having an inner threaded surface which surrounds and engages the first member. The threaded portion of the collar would engage an outer threaded surface constructed on the second member of the second guide which is displaced from the second tube. The collar would be capable of moving axially relative to the first axis and be limited in its travel by its impingement or contact with the first member of the first guide.

It may be apparent that a novel and useful fiber-optic connector has been hereinabove described.

It is therefore an object of the present invention to provide a fiber-optic connector which is useable with a fiberscope to easily connect and disconnect an auxiliary source of light.

Another object of the present invention is to provide a fiber-optic connector which is useable with an auxiliary source of light in a fiberscope and is capable of accurately aligning tubes coupling the source of light with a fiber-optic bundle.

Another object of the present invention is to provide a fiber-optic connector which is usable with a fiberscope that efficiently and accurately couples the source of light with a fiber-optic bundle and permits the adjustment of the beam of light emanating from the source of light to prevent filament shadows from falling on the fiber-optic bundle.

Yet another object of the present invention is to provide a fiber-optic connector between a light source and a fiber-optic bundle which is usable on a fiberscope and is rugged and relatively simple to manufacture and repair.

Another object of the present invention is to provide a fiber-optic connector useable with a fiberscope that is easily disconnected for use in surveillance situations.

The invention possesses other objects and advantages especially as concerns particular characteristics and features thereof which will become apparent as the specification continues.

For a better understanding of the invention reference is made to the following detailed description of the preferred embodiments thereof which should be taken in conjunction with the prior described drawings.

DETAILED DESCRIPTION OF THE PREFERRED EMBODIMENTS OF THE INVENTION

Various aspects of the present invention will evolve from the following detailed description of the preferred embodiments thereof which should be referenced to the hereinabove-delineated drawings.

Figure 1:
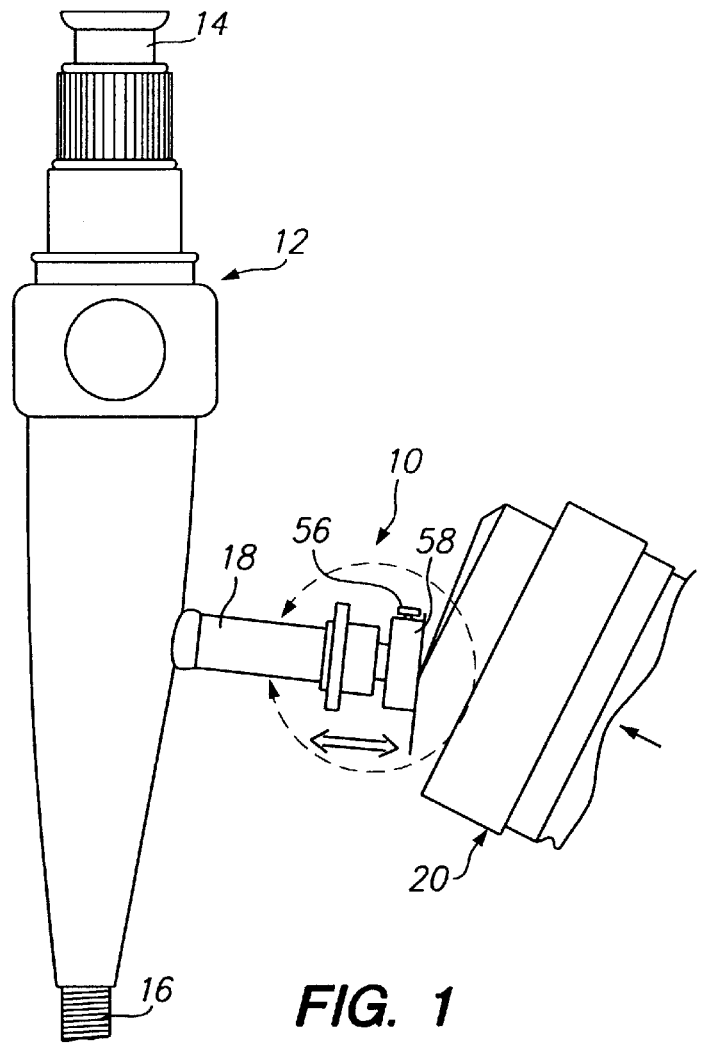
FIG. 1 is a top plan view of a portion of a fiberscope and the connector of the present invention.

The invention as a whole is shown in the drawings by reference character 10. Connector 10 is used in conjunction with a fiberscope 12 shown partially in FIG. 1. Fiberscope 12 includes an optical viewing area 14 and a fiber-optic articulated portion which provides an image to the optical viewing section 14. Fiberscope 12 is of conventional configuration and its construction is known in the art. Auxiliary light may be fed to fiberscope 12 through auxiliary light entrance 18. It should be noted that light is provided by a light source 20 which may include a lamp having a filament (not shown). Such auxiliary light source may take the form of a device known as the HIGH-LIGHT handle distributed by Campbell Security Equipment Company of Pleasant Hill, Calif. In any case, connector 10 links auxiliary light source 20 to fiber scope 12 when needed and permits the removal of light source 20 from fiberscope 20, as the case demands.

Figure 2:
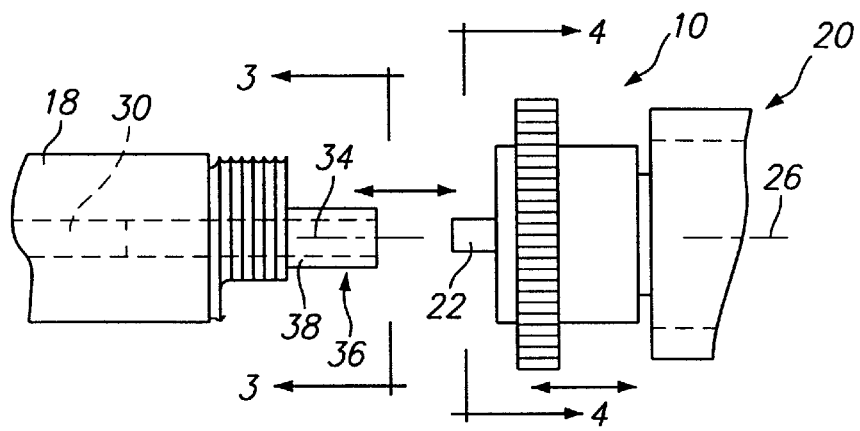
FIG. 2 is a side elevational view of the connector of the present invention in broken format.
Figure 3:
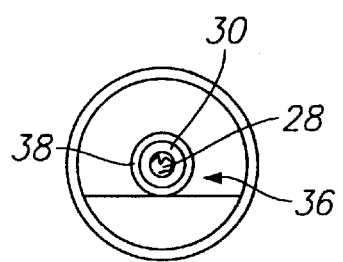
FIG. 3 is a view taken along line 3—3 of FIG. 2.
Figure 4:
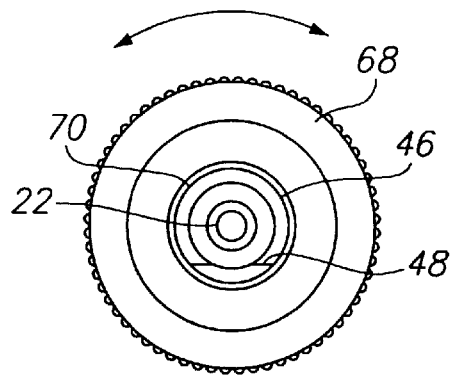
FIG. 4 is a view taken along line 4—4 of FIG. 2.

FIG. 2 depicts a portion of the configuration of connector 10. Connector 10 includes as one of its elements a first tube 22 which passes a beam of light indicated by directional arrow 24 of FIG. 5. First tube 22 lies along axis 26. It should be noted that beam of light 24 emanating from source 20 does not coincide with axis 26, but is purposefully displaced a predetermined amount, e.g. 15 degrees, to prevent filament shadows on fiber-optic bundle 28 found within auxiliary light entrance 18 to fiber scope 12.

A second tube 30 is found within auxiliary light entrance 18 and contains fiber-optic bundle 28 for the passage of light to articulated imaging section 16 of fiberscope 12. Directional arrow 32 indicates such passage of light. First tube 22 is separable from second tube 30 and such separation is depicted in FIG. 2. Second tube 22 lies along a second axis 34 which eventually will coincide with first axis 26 when first tube 22 and second tube 30 are positioned adjacent one another or in contact with one another.

To accurately assure the proper positioning of first tube 18 relative to second tube 18, connector 10 employs a first guide 36. First guide 36 includes a bushing 38 which surrounds first tube 22 such that first tube 22 lies in the bore 40 of bushing 38. As shown in the drawings, bushing 36 overlies second tube 28 as well although this is not required in the structure of first guide 36. In any case, first guide 36 is fixed relative to second tube 28. First tube 22 moves along first axis 26 while in the bore 30 of first guide 36. Such movement permits first tube 22 to lie or position in a place adjacent second tube 28 shown partially in phantom in FIG. 5. Directional arrow 42 indicates such movement. FIG. 6 shows the partial movement of first tube 22 within bore 40 of bushing 38, prior to the positioning of first tube 22 adjacent to second tube 30.

A second guide 44 is also depicted in the drawings. Second guide 44 possesses a first member 46 which is linked to first tube 22 in circumventing relationship. First member 46 includes a planar surface 48. A second member 50 is linked or associated with second tube 30 and includes a planar surface 52. Planar surface 48 of first member 46 slidingly engages planar surface 52 of second member 50 when tubes 22 and 30 are brought together through first guide 36. The orientation of planar surfaces 48 and 52 determine the circumferential orientation of tube 22 within connector 10. Such radial orientation ultimately determines the angle of light source portion 20 of fiberscope 12 relative to connector 10 and the angle of the light beam emanating from light source 20 passing through tube 22. It should be realized, that first member 46 is rotatable relative to first tube 22. Such rotation orients planar surface 48 relative to first axis 26. The rotation of first member 46 is determined by groove 54 which is penetrated by said screw 56 engaging body 58, which is a portion of connector 10.

Gauge means 60 is also provided in the present invention such means is provided by a wall 62 of first member 46 and the edge 64 of bushing 38. That is to say, edge 64 of bushing 38 meets wall 62 of first member 46 and prevents further movement relative to tubes 22 and 30 along axis 26 and coincident axis 34.

Figure 5:
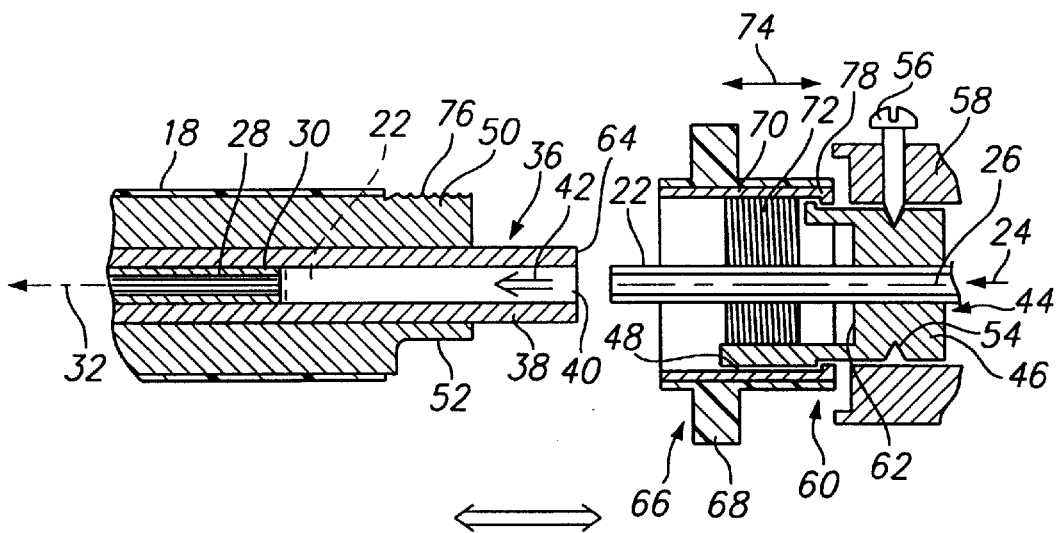
FIG. 5 is a sectional view of the connector of the present invention.
Figure 6:
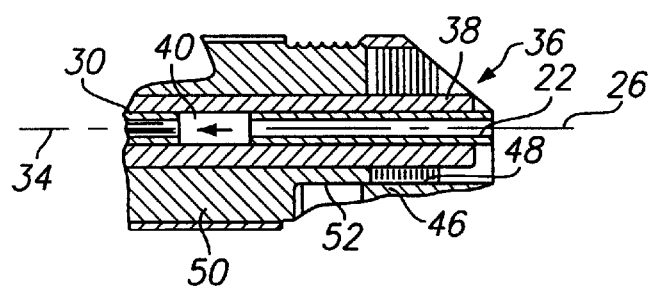
FIG. 6 is a partial sectional view showing the mating of the first and second guides of the connector of the present invention.

Once tubes 22 and 30 adjoin or are placed in the adjacent relationship shown in phantom on FIG. 5, such position is maintained by collar 66. Collar 66 includes an outer insulated cover 68 and an inner ring 70 having a threaded surface 72. Collar 66 is movable relative to first tube 22 according to directional arrow 74. Second member 50 also includes a threaded surface 76 which extends about second member 50 except for the interruption afforded by planar surface 52. In any case, threaded surface 72 of collar 66 threadingly engages threaded surface 76 of second member 50 to secure the placement of first tube 22 adjacent second tube 30 within bushing 38. Flange 78 of ring 70 impinges or is stopped by first member 46 is movement toward second tube 28.

In operation, the user fixes the angle of planar surface 48 of first member 46 to provide the proper orientation of light source section 20 of fiberscope 12 relative to connector 10. Such orientation is accomplished by rotation of first member 46 relative to tube 22 and the fixing of the same by the tightening of set-screw 56 within groove 54 of first member 46. First tube 22 is then placed within bore 40 of bushing 38 of first guide 36 and moved according to directional arrow 42, FIG. 5. When tube 22 adjoins tube 30 containing fiber-optic bundle 28, gauge means 60 will come into play. At this point, edge 64 of bushing 38 rests on wall 62 of first member 46. Bushing 38, of course, guides first tube 22 along axis 26 within bore 40 such that axis 26 generally coincides with axis 34 of second tube 30. Collar 66 is then operated such that threaded portion 72 of ring 70 engages threaded portion 76 of second member 50 by turning collar 70. When collar 70 is tightened, flange 78 impinges on first member 46. Thus, connector 10 has effected an adjoining between tube 22 and tube 30 to permit light to pass through tube 22 and into fiber-optic bundle 28 within tube 30. The reverse operation takes place when separation of tube 22 and tube 30 is desired.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A fiber-optic connector between a light source and a fiber-optic bundle, comprising:
   a. a first tube for receiving the source of light, said first tube lying along a first axis;
   b. a second tube containing a fiber-optic bundle, said second tube being separable from said first tube, said second tube lying along a second axis;
   c. a first guide surrounding said first tube, said first guide positions said first tube along said first axis to a place adjacent said second tube; and
   d. a second guide for directing said first tube circumferentially about said first axis, said second guide including a first member linked to said first tube, said first member including a planar surface and a second member linked to said second tube, said second member including a planar surface, said planar surface of said first member engaging said planar surface of said second member when said first and second tubes abut one another.

2. The connector of claim 1 in which said first guide further comprises a bushing circumventing said first and second tubes lying adjacent one another.

3. The connector of claim 1 in which said first guide directs said first tube into engagement with said second tube.

4. The connector of claim 1 in which said second member includes a threaded surface displaced from said second tube and which further comprises a collar surrounding said first member, said collar including a threaded surface which threadingly engages said threaded surface of said second member, said collar impinging on said first member.

5. The connector of claim 1 which further includes a gauge means for regulating the movement of said first tube relative to said first guide.

6. The connector of claim 5 in which said gauge means further comprises a surface on said first guide engages a surface on said second guide.

7. The connector of claim 1 which further comprises means for adjusting the position of said planar surface of said first member circumferentially relative to said first axis.

8. The connector of claim 7 in which said first guide further comprises a bushing circumventing said first and second tubes lying adjacent one another.

9. The connector of claim 7 in which said first guide directs said first tube into engagement with said second tube.

10. The connector of claim 7 in which said second member includes a threaded surface displaced from said second tube and which further comprises a collar surrounding said first member, said collar including a threaded surface which threadingly engages said threaded surface of said second member, said collar impinging on said first member.

11. The connector of claim 7 which further includes a gauge means for regulating the movement of said first tube relative to said first guide.

12. The connector of claim 11 in which said gauge means further comprises a surface on said first guide engages a surface on said second guide.

* * * * *